United States Patent [19]
Fontanella et al.

[11] 3,817,987
[45] June 18, 1974

[54] 2,4-BENZOXAZEPINE DERIVATIVES

[75] Inventors: Luigi Fontanella; Luigi Mariani, both of Milan, Italy

[73] Assignee: Gruppo Lepetit S.p.A., Milan, Italy

[22] Filed: May 23, 1973

[21] Appl. No.: 363,225

[30] Foreign Application Priority Data
June 23, 1972 Italy .................................. 26110/72

[52] U.S. Cl. .......................... 260/239.3 B, 424/244
[51] Int. Cl. ........................................... C07d 89/20
[58] Field of Search ............................. 260/239.3 B

[56] References Cited
UNITED STATES PATENTS
3,346,565   10/1967   Testa et al. .................... 260/239.3 B

*Primary Examiner*—Henry R. Jiles
*Assistant Examiner*—Robert T. Bond
*Attorney, Agent, or Firm*—Theodore Post; C. Kenneth Bjork

[57] ABSTRACT

2,4-Benzoxazepine derivatives of formula (I)

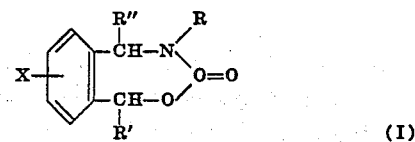

(I)

wherein R is hydrogen, lower alkyl or benzyl, R' and R'' independently represent hydrogen, phenyl or substituted phenyl, not more than one of which is hydrogen and X is hydrogen, halo or lower alkoxy. The fundamental seven-membered benzoxazepine system is prepared by reacting a compound of formula (II)

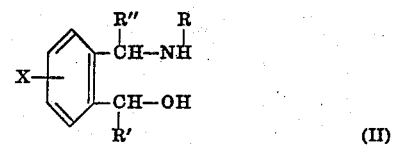

(II)

wherein R, R', R'' and X have the above meanings, with phosgene or an equivalent carbonylating agent.

The compounds of the invention have hypnotic, sedative and myorelaxing activity.

9 Claims, No Drawings

2,4-BENZOXAZEPINE DERIVATIVES

SUMMARY OF THE INVENTION

The present invention relates to a new class of pharmacologically active compounds, 2,4-benzoxazepine derivatives of following Formula I

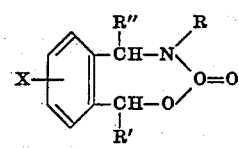

wherein R is a member of the class consisting of hydrogen, lower alkyl or benzyl, R' and R'' independently represent hydrogen, phenyl or substituted phenyl, not more than one of which is hydrogen, and X is hydrogen, halo or lower alkoxy.

As used in the specification and claims, the terms "lower alkyl" and "lower alkoxy" designate groups containing from one, to two, to three, to four carbon atoms, such as methyl, ethyl, propyl or butyl, and the corresponding alkoxy groups, "substituted phenyl" designates phenyl substituted with halo, lower alkyl or lower alkoxy groups, and "halo" designates chloro or bromo.

The process for preparing the fundamental seven-membered benzoxazepine system consists essentially in reacting a compound of formula (II)

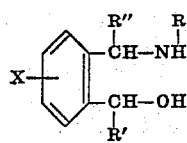

wherein R, R', R'' and X have the above meanings, with phosgene or equivalent other carbonylating agent, such as, for instance, carbonyl-bis-imidazole, a di-lower alkyl carbonate or 1,3-dioxolan-2-one.

DESCRIPTION OF THE PREFERRED EMBODIMENTS

The starting compounds (II) are prepared as described in the examples herein. In a preferred mode for preparing the fundamental seven-membered benzoxazepine, an amount of starting compound (II) is allowed to react with at least two molecular proportions of phosgene in an inert organic solvent, such as benzene, toluene, carbon tetrachloride or trichloroethylene, in the presence of a suitable amount of an alkali metal hydroxide or carbonate acid acceptor. The reaction mixture is stirred for a time varying from about 30 minutes to about 20 hours at atmospheric pressure within a range of temperature varying from room temperature to the boiling temperature of the solvent medium, or until byproduct chloride of reaction no longer forms. The final product is then recovered, following usual procedures well known to those skilled in the field of organic chemistry. For instance, the solvent is evaporated and the residue may be purified by crystallization from a suitable solvent, by chromatography or by fractional distillation under reduced pressure. The starting compounds (II) also may be employed as their mineral acid salts; in this case, a suitable amount of a strong base is required to set free the corresponding starting compound as its free base.

Compounds of the general formula (I), wherein R is lower alkyl or benzyl also may be obtained by introducing the appropriate group onto basic compounds of formula (I), wherein R is hydrogen, through conventional methods, for instance by reacting a 4-unsubstituted-2,4-benzoxazepine-3(1H)-one with a suitable lower alkyl or benzyl halide.

Other obvious routes useful for introducing a suitable substituent on the nitrogen atom of the benzoxazepine ring may be used, and are intended to fall within the scope of this invention.

The following examples further describe the invention and the manner and process of making and using it so as to enable any art skilled person to make and use the same, and set forth the best mode contemplated by the inventors of carrying out the invention.

EXAMPLE 1

4-Methyl-1-phenyl-4,5-dihydro-2,4-benzoxazepine-3(1H)-one

To a mixture of 15.2 g. of 2-methylaminomethyl-benzhydrol and 12 g. of finely ground sodium carbonate in 60 ml. of trichloroethylene, a solution of 7.5 g. of phosgene in 30 ml. of trichloroethylene is added dropwise at 0°C. After stirring two hours at 0°C. and 2 hours at room temperature, 6 g. of sodium carbonate is added thereto and the mixture is refluxed for 5 hours.

After cooling, the solid salt which forms is filtered off and washed with diethyl ether. The two organic phases are collected and the title compound crystallized on chilling. Yield 5.3 g. M.p. 163°–166°C. (from ethanol).

EXAMPLES 2–5

Pursuant to the method described in Example 1, the following compounds are prepared, starting with a suitable benzhydrol and using about two molecular proportions of phosgene.

2. 4-Ethyl-1-phenyl-4,5-dihydro-2,4-benzoxazepine-3(1H)-one,
  from 15 g. of 2-ethylaminomethyl-benzhydrol. Yield 7 g. M.p. 111°–113°C. (from diisopropyl ether).
3. 1-Phenyl-4-propyl-4,5-dihydro-2,4-benzoxazepine-3(1H)-one,
  from 15 g. of 2-propylaminomethyl-benzhydrol. Yield 8.5 g. M.p. 96°–98°C. (from diisopropyl ether).
4. 4-Butyl-1-phenyl-4,5-dihydro-2,4-benzoxazepine-3(1H)-one,
  from 10 g. of 2-butylaminomethyl-benzhydrol. Yield 6 g. M.p. 54°–55°C. (from diisopropyl ether).
5. 4-Benzyl-1-phenyl-4,5-dihydro-2,4-benzoxazepine-3(1H)-one,
  from 8.5 g. of 2-benzylaminomethyl-benzhydrol. Yield 5 g. M.p. 104°–106°C. (from diisopropyl ether).

EXAMPLE 6

8-Chloro-1-phenyl-4,5-dihydro-2,4-benzoxazepine-3(1H)-one

The title compound is prepared substantially as described in Example 1, substituting 2-aminomethyl-5-chloro-benzhydrol in place of 2-methylaminomethyl-benzhydrol, and carbonyl-bis-imidazole in place of phosgene. Yield 41.3%. M.p. 150°–152°C. (from ethyl acetate).

EXAMPLE 7

8-Chloro-4-methyl-1-phenyl-4,5-dihydro-2,4-benzoxazepine-3(1H)-one

Starting with 11 g. of 2-methylaminomethyl-5-chloro-benzhydrol and about two molecular proportions of phosgene, and following the procedure described in Example 1, 8.4 g. of the title compound is obtained. M.p. 131°–134°C. (from methanol).

EXAMPLE 8

8-Chloro-1-phenyl-4-propyl-4,5-dihydro-2,4-benzoxazepine-3(1H)-one

The title compound is prepared substantially as described in Example 1, starting with 9.4 g. of 2-propylaminomethyl-5-chloro-benzhydrol and about two molecular proportions of phosgene. Yield 3.5 g. M.p. 103°–104°C. (from ligroin).

EXAMPLES 9–10

The following compounds were prepared pursuant to the method described in Example 1, using the appropriate benzhydrol derivative and about two molecular proportions of phosgene.

9. 8-Chloro-4-ethyl-1-phenyl-4,5-dihydro-2,4-benzoxazepine-3(1H)-one,
   from 4 g. of 5-chloro-2-ethylaminomethyl-benzhydrol. Yield 2.5 g. M.p. 97°–99°C. (from diisopropyl ether).
10. 4-Butyl-8-chloro-1-phenyl-4,5-dihydro-2,4-benzoxazepine-3(1H)-one,
    from 10.6 g. of 2-butylaminomethyl-5-chloro-benzhydrol. Yield 10 g. M.p. 110°C. (from diisopropyl ether).

EXAMPLE 11

4-Butyl-5-phenyl-4,5-dihydro-2,4-benzoxazepine-3(1H)-one

To a mixture of 8 g. of 2-[α-(butylamino)benzyl]-benzyl alcohol and 8 g. of sodium carbonate in 50 ml. of trichloroethylene, a solution of 3.2 g. of phosgene in 30 ml. of trichloroethylene is added dropwise at 0°C. The mixture is successively stirred for 1 hour at about 5°C., 1 hour at room temperature and 9 hours under reflux. After 4 hours' reflux, 4 g. of sodium carbonate is added to neutralize the hydrogen chloride formed during the reaction, and refluxing is continued for an additional 5 hours. The reaction mixture is then chilled, the inorganic precipitate is separated by filtration, and the solvent is evaporated. The residue is taken up with a mixture of aqueous hydrochloric acid and diethyl ether. The organic phase is successively washed with water and a solution of sodium hydrogen carbonate and dried over sodium sulfate. After filtering off the sodium sulfate, the solvent is evaporated, leaving 5 g. of a crude product which is chromatographed through silica gel using benzene containing 3 percent of diethyl ether as the eluent. The title compound is collected and distilled. Yield 1.5 g. B.p. 180°C./0.4 mm Hg.

EXAMPLES 12–15

Pursuant to the procedure described in preceding Example 11, and employing a proper benzyl alcohol derivative and about two molecular proportions of phosgene, the following compounds are obtained.

12. 4-Methyl-5-phenyl-4,5-dihydro-2,4-benzoxazepine-3(1H)-one,
    from 3 g. of 2-[α-(methylamino)benzyl]-benzyl alcohol. Yield 1.5 g. M.p. 128°–130°C. (from diisopropyl ether).
13. 4-Ethyl-5-phenyl-4,5-dihydro-2,4-benzoxazepine-3(1H)-one,
    from 2.2 g. of 2-[α-(ethylamino)benzyl]-benzyl alcohol. Yield 1.1 g. M.p. 162°–163°C. (from diisopropyl ether).
14. 5-Phenyl-4-propyl-4,5-dihydro-2,4-benzoxazepine-3(1H)-one,
    from 5.6 g. of 2-[α-(propylamino)benzyl]-benzyl alcohol. Yield 3.3 g. M.p. 70°–72°C. (from diisopropyl ether).
15. 4-Benzyl-5-phenyl-4,5-dihydro-2,4-benzoxazepine-3(1H)-one,
    from 5.3 g. of 2-[α-(benzylamino)benzyl]-benzyl alcohol. Yield 4.6 g. M.p. 101°–103°C. (from diisopropyl ether).

EXAMPLE 16

7-Chloro-4-methyl-5-phenyl-2,4-benzoxazepine-3(1H)-one

The title compound is prepared substantially as described in Example 11, starting with 2.3 g. of 4-chloro-2-[α-(methylamino)benzyl]-benzyl alcohol. Yield 1.8 g. M.p. 156°–158°C. (from light petroleum).

EXAMPLES 17–19

The following compounds are prepared according to the method described in Example 11 by employing a suitable benzyl alcohol derivative and about two molecular proportions of phosgene.

17. 7-Chloro-4-ethyl-5-phenyl-4,5-dihydro-2,4-benzoxazepine-3(1H)-one,
    from 2.3 g. of 4-chloro-2-[α-(ethylamino)benzyl]-benzyl alcohol. Yield 1.1 g. M.p. 144°–146°C. (from diethyl ether).
18. 7-Chloro-5-phenyl-4-propyl-4,5-dihydro-2,4-benzoxazepine-3(1H)-one,
    from 6.3 g. of 4-chloro-2-[α-(propylamino)benzyl]-benzyl alcohol. Yield 4.5 g. M.p. 134°–137°C. (from diethyl ether).
19. 7-Chloro-4-butyl-5-phenyl-4,5-dihydro-2,4-benzoxazepine-3(1H)-one,
    from 3.3 g. of 4-chloro-2-[α-(butylamino)benzyl]-benzyl alcohol. Yield 3.4 g. M.p. 164°–167°C. (from diethyl ether).

The following starting compounds of Examples 1–5 and 7–10 are prepared substantially according to the method described by K. Freter and M. Götz, Can. Journal of Chemistry 48, 1670, 1970.

| Compounds | M.p.°C. B.p.°C./mm Hg. |
| --- | --- |
| 2-Methylaminomethyl-benzhydrol | 190°C./0.6mm Hg. |

-Continued

| Compounds | M.p.°C. B.p.°C./mm Hg. |
|---|---|
| 2-Ethylaminomethyl-benzhydrol | 190–200°C./0.6mm Hg. |
| 2-Propylaminomethyl-benzhydrol | 190°C./0.6mm Hg. |
| 2-Butylaminomethyl-benzhydrol | 190–195°C./0.6mm Hg. |
| 2-Benzylaminomethyl-benzhydrol | 220°C./0.6mm Hg. |
| 5-Chloro-2-methylaminomethyl benzhydrol | 80–82°C. |
| 5-Chloro-2-propylaminomethyl benzhydrol | 85–87°C. |
| 5-Chloro-2-ethylaminomethyl benzhydrol | 195°C./0.5mm Hg. |
| 5-Chloro-2-butylaminomethyl benzhydrol | 58–60°C. |

The following starting compound for Example 6 was also prepared substantially following the method described by K. Freter and M. Götz in Can. Journal of Chemistry, 48, 1670, 1970.

| Compound | M.p. °C. |
|---|---|
| 2-Aminomethyl-5-chloro-benzhydrol | 120–124°C. |

The starting compounds for Examples 16–19 are prepared from the corresponding 0-acetyl bromide and the selected aliphatic amine followed by alkaline hydrolysis of the acetoxy group. The 0-acetyl bromides are prepared according to the method of Pifferi et al., Farmaco, Ed. Sci. 26(12), 1041 (1971).

| Compounds | M.p. °C. B.p. °C./mm Hg. |
|---|---|
| 4-Chloro-2-[α-(methylamino)benzyl]-benzyl alcohol | 117–118°C. |
| 4-Chloro-2-[α-(ethylamino)benzyl]-benzyl alcohol | 190–195°C./0.5 |
| 4-Chloro-2-[α-(propylamino)benzyl]-benzyl alcohol | 225–227°C. |
| 4-Chloro-2-[α-(butylamino)benzyl]-benzyl alcohol | 190–195°C./0.5 |

The starting compounds for Examples 11–15 are prepared in a similar manner as for those of Examples 16–19 and are advantageously used in the crude state.

2-[α-(butylamino)benzyl]-benzyl alcohol
2-[α-(methylamino)benzyl]-benzyl alcohol
2-[α-(ethylamino)benzyl]-benzyl alcohol
2-[α-(propylamino)benzyl]-benzyl alcohol
2-[α-(benzylamino)benzyl]-benzyl alcohol The compounds of the invention have central nervous system activity, characterized by hypnotic, sedative and myorelaxing activity. Representative compounds of the invention also show an anxiety-relieving effect in rats.

The decrease of the spontaneous activity in mice after intraperitoneal administration of an effective amount of representative compounds of this invention was taken as a measure of the sedative effect, while impairment of motor coordination and of the righting reflex were related to hypnotic properties. The myorelaxing characteristics were evaluated by considering the body tone, while the anxiety-relieving effect was measured on the basis of the secondary conditioned avoidance response.

In representative experiments, amounts from about 10 to about 100 mg/kg i.p. of compounds of Examples 7, 8, 11 and 16 were found to be particularly active on the mentioned parameters. These favorable pharmacological properties are coupled with a very low toxicity, the $LD_{50}$ values in mice being always higher than 500 mg/kg.

We claim:

1. A benzoxazepine derivative represented by the formula

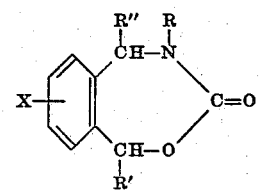

wherein R represents a member of the group consisting of hydrogen, lower alkyl or benzyl, R' and R'' each independently represents hydrogen, phenyl or substituted phenyl, not more than one of which represents hydrogen, X represents a member of the group consisting of hydrogen, halo and lower alkoxy.

2. The compound of claim 1 which is 8-chloro-4-methyl-1-phenyl-4,5-dihydro-2,4-benzoxazepine-3(1H)-one.

3. The compound of claim 1 which is 8-chloro-1-phenyl-4-propyl-4,5-dihydro-2,4-benzoxazepine-3(1H)-one.

4. The compound of claim 1 which is 4-butyl-5-phenyl-4,5-dihydro-2,4-benzoxazepine-3(1H)-one.

5. The compound of claim 1 which is 7-chloro-4-methyl-5-phenyl-4,5-dihydro-2,4-benzoxazepine-3(1H)-one.

6. The compound of claim 1 which is 7-chloro-5-phenyl-4-propyl-4,5-dihydro-2,4-benzoxazepine-3(1H)-one.

7. A process for preparing a benzoxazepine derivative of the formula

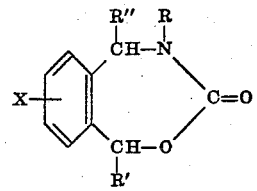

wherein R represents a member of the group consisting of hydrogen, lower alkyl or benzyl, R' and R'' each independently represents hydrogen, phenyl or substituted phenyl, not more than one of which represents hydrogen and X represents a member of the group consisting of hydrogen, halo and lower alkoxy, which comprises treating a molar proportion of a compound of the formula

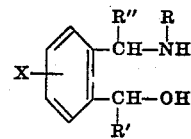

wherein R, R', R'' and X have the above meanings with about two molar proportions of a carbonylating agent selected from phosgene and carbonyl-bis-imidazole in the presence of an alkali metal hydroxide or carbonate and in an inert organic solvent, at a temperature and for a time sufficient to form the said product, and, if desired, when R is hydrogen introducing another substituent group onto the nitrogen atom.

8. The process of claim 6 wherein the carbonylating agent is phosgene.

9. The process of claim 6 wherein the carbonylating agent is carbonyl-bis-imidazole.

* * * * *

UNITED STATES PATENT OFFICE
CERTIFICATE OF CORRECTION

Patent No. 3,817,987      Dated June 18, 1974

Inventor(s) Luigi Fontanella and Luigi Mariani

It is certified that error appears in the above-identified patent and that said Letters Patent are hereby corrected as shown below:

In the Abstract, Formula (I) should appear as follows:

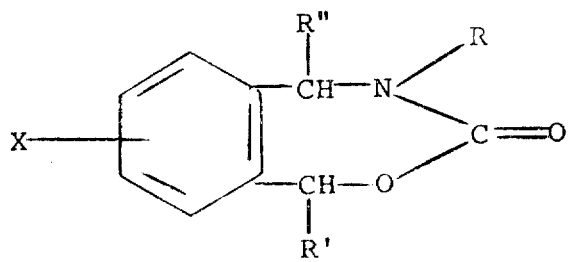

Column 1, line 10, formula (I) should appear as follows:

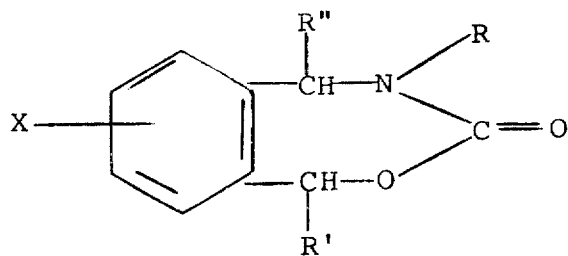

Signed and sealed this 12th day of November 1974.

(SEAL)
Attest:

McCOY M. GIBSON JR.
Attesting Officer

C. MARSHALL DANN
Commissioner of Patents